United States Patent
Özer et al.

(10) Patent No.: US 11,321,051 B2
(45) Date of Patent: May 3, 2022

(54) STATISTICAL MODE DETERMINATION

(71) Applicant: Arm Limited, Cambridge (GB)

(72) Inventors: Emre Özer, Buckden (GB); Jedrzej Kufel, Littleport-Ely (GB); Mbou Eyole, Soham (GB); John Philip Biggs, Cambridge (GB)

(73) Assignee: Arm Limited, Cambridge (GB)

( * ) Notice: Subject to any disclaimer, the term of this patent is extended or adjusted under 35 U.S.C. 154(b) by 381 days.

(21) Appl. No.: 16/417,840

(22) Filed: May 21, 2019

(65) Prior Publication Data

US 2020/0371806 A1 Nov. 26, 2020

(51) Int. Cl.
*G06F 17/18* (2006.01)
*G06F 7/544* (2006.01)
*G06F 7/60* (2006.01)
*G06F 7/22* (2006.01)

(52) U.S. Cl.
CPC .............. *G06F 7/544* (2013.01); *G06F 7/22* (2013.01); *G06F 7/607* (2013.01); *G06F 17/18* (2013.01)

(58) Field of Classification Search
CPC ...................................................... G06F 17/18
See application file for complete search history.

(56) References Cited

U.S. PATENT DOCUMENTS

| | | | |
|---|---|---|---|
| 2003/0167275 A1 | 9/2003 | Rjaibi | |
| 2014/0330884 A1* | 11/2014 | Meng | ............ H04L 67/10 709/201 |
| 2019/0042253 A1 | 2/2019 | Eyole et al. | |
| 2019/0057092 A1* | 2/2019 | Craske | .............. G06F 16/24578 |
| 2020/0410361 A1* | 12/2020 | Okajima | .............. G06N 3/0445 |
| 2021/0049428 A1* | 2/2021 | Huang | ................... G06N 20/00 |

OTHER PUBLICATIONS

Robert Bedichek, "Some Efficient Architecture Simulation Techniques", Department of Computer Science, FR-35, University of Washington, Winter 1990 USENIX Conference, 12 pages.
International Search Report and Written Opinion of the International Searching Authority for PCT/GB2020/050793 dated Jun. 18, 2020, 13 pages.

* cited by examiner

*Primary Examiner* — Chuong D Ngo
(74) *Attorney, Agent, or Firm* — Nixon & Vanderhye P.C.

(57) ABSTRACT

Apparatuses, methods of operating apparatuses, and corresponding computer programs are disclosed. In the apparatuses input circuitry receives input data comprising at least one data element and shift circuitry generates, for each data element of the input data, a bit-map giving a one-hot encoding representation of the data element, wherein a position of a set bit in the bit-map is dependent on the data element. Summation circuitry generates a position summation value for each position in the bit-map, wherein each position summation value is a sum across all bit-maps generated by the shift circuitry from the input data. Maximum identification circuitry determines at least one largest position summation value generated by the summation circuitry and output circuitry to generate an indication of at least one data element corresponding to the at least one largest position summation value. The statistical mode of the data elements in the input data is thereby efficiently determined.

23 Claims, 11 Drawing Sheets

STATISTICAL MODE DETERMINATION

TECHNICAL FIELD

The present invention relates to data processing. More particularly the present invention relates to determining the statistical mode amongst a set of data values.

DESCRIPTION

There are a range of contexts in which it may be useful for a data processing apparatus to determine the statistical mode (i.e. the most frequent element(s)) of a set of data values. To name just one example, in an apparatus implementing a machine learning classification model use may be made of a statistical mode operation to determine a final classification selection from amongst a number of candidate classifications. Finding the statistical mode amongst the data values given by an input set of data elements in principle comprises three sub-operations. Firstly, a set of counts (or "histograms") of the data values is found by iterating over the list of elements and forming a histogram list. Secondly, the highest count in the histogram list, i.e. the maximum count, is found. Finally, the elements or elements with the maximum count are selected as the statistical mode. Typically, the implementation of these steps is made over several processing cycles by holding intermediate results in sequential logic such as registers. However, there may be some contexts in which the statistical mode should be calculated, but it would also be useful for the data processing apparatus to be of limited complexity, and in such contexts the high gate count required to provide registers can make their use disadvantageous.

SUMMARY

In example embodiments described herein there is an apparatus comprising: input circuitry to receive input data comprising at least one data element; shift circuitry to generate, for each data element of the input data, a bit-map giving a one-hot encoding representation of the data element, wherein a position of a set bit in the bit-map is dependent on the data element; summation circuitry to generate a position summation value for each position in the bit-map, wherein each position summation value is a sum across all bit-maps generated by the shift circuitry from the input data; maximum identification circuitry to determine at least one largest position summation value generated by the summation circuitry; and output circuitry to generate an indication of at least one data element corresponding to the at least one largest position summation value.

In another example embodiment described herein there is a method of operating an apparatus comprising: receiving input data comprising at least one data element; generating, for each data element of the input data, a bit-map giving a one-hot encoding representation of the data element, wherein a position of a set bit in the bit-map is dependent on the data element; generating a position summation value for each position in the bit-map, wherein each position summation value is a sum across all bit-maps generated from the input data; determining at least one largest position summation value generated; and generating an indication of at least one data element corresponding to the at least one largest position summation value.

In another example embodiment described herein there is a computer program for controlling a host data processing apparatus to provide an instruction execution environment comprising: data processing logic to perform data processing operations, the data processing logic comprising: input logic to receive input data comprising at least one data element; shift logic to generate, for each data element of the input data, a bit-map giving a one-hot encoding representation of the data element, wherein a position of a set bit in the bit-map is dependent on the data element; summation logic to generate a position summation value for each position in the bit-map, wherein each position summation value is a sum across all bit-maps generated by the shift logic from the input data; maximum identification logic to determine at least one largest position summation value generated by the summation logic; and output logic to generate an indication of at least one data element corresponding to the at least one largest position summation value, instruction decoder logic to decode instructions and to generate control signals in dependence on the instructions to control the data processing logic to perform the data processing operations, wherein the instruction decoder logic is responsive to a statistical mode instruction specifying a vector input register to generate control signals to control the input logic to receive the input data from the vector input register.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
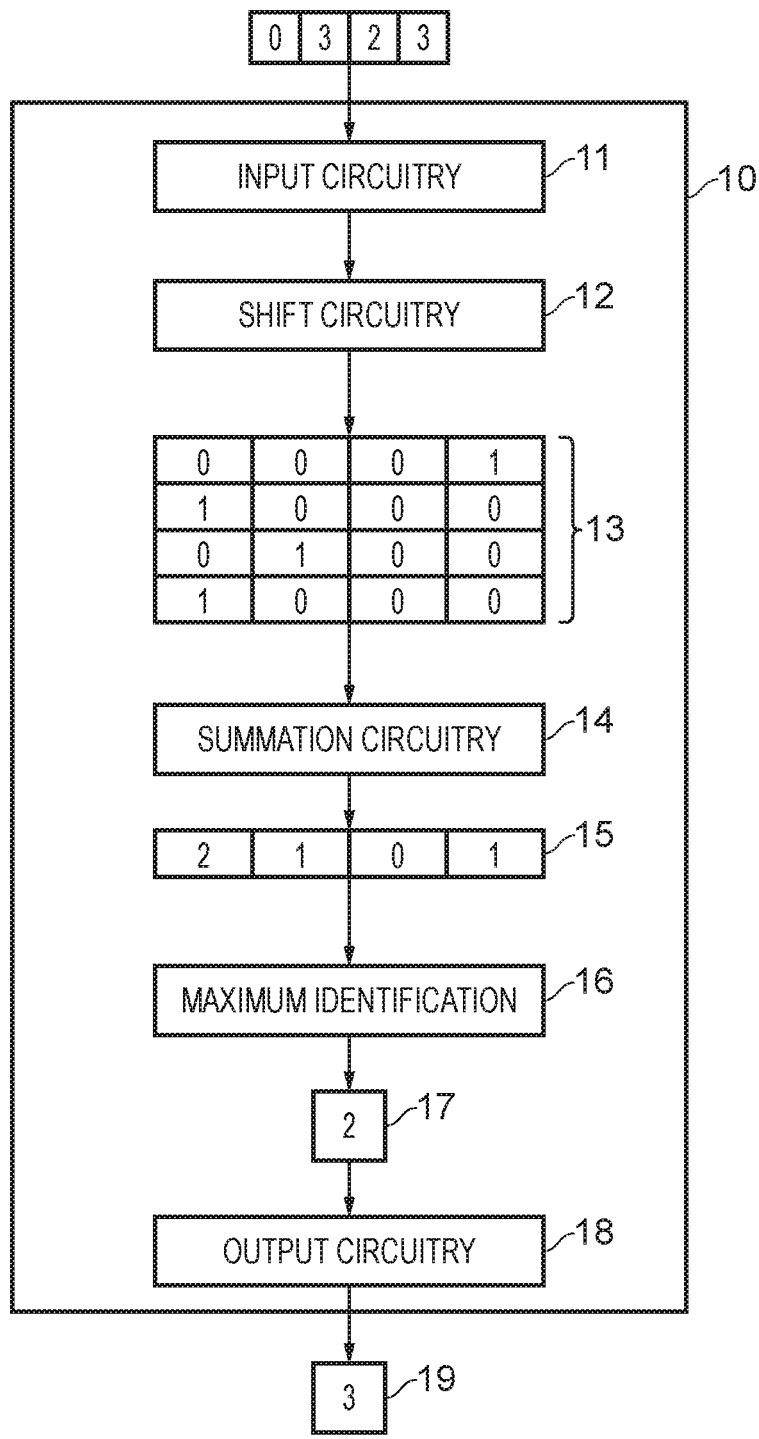
FIG. 1 schematically illustrates an apparatus in some example embodiments.

Before discussing the embodiments with reference to the accompanying figures, the following description of embodiments is provided.

In accordance with one example configuration there is provided an apparatus comprising: input circuitry to receive input data comprising at least one data element; shift circuitry to generate, for each data element of the input data, a bit-map giving a one-hot encoding representation of the data element, wherein a position of a set bit in the bit-map is dependent on the data element; summation circuitry to generate a position summation value for each position in the bit-map, wherein each position summation value is a sum across all bit-maps generated by the shift circuitry from the input data; maximum identification circuitry to determine at least one largest position summation value generated by the summation circuitry; and output circuitry to generate an indication of at least one data element corresponding to the at least one largest position summation value.

The present techniques present an approach according to which shift circuitry is used to generate a "one-hot" encoding representation of each data element which is received by the apparatus amongst an input data set for which the statistical mode is to be generated. These one-hot encodings may not only be relatively simply generated (for example by the use of barrel shifters), but also represent a usefully simple input for summation circuitry to calculate summation values across the set of one-hot encoding representations. In effect this then generates the required set of histogram counts for which a maximum can then be identified and thus provide an indication of the statistical mode amongst the input data elements, i.e. the data value which occurred most frequently in the input data set. An efficient yet non-complex hardware mechanism for determining the statistical mode amongst the input data set is thereby provided.

The maximum identification circuitry may be provided in a variety of ways to determine the at least one largest position summation value (i.e. the highest histogram count or counts), but in some embodiments the maximum identification circuitry comprises reduction tree circuitry to perform a comparison-and-selection process on the position summation values generated by the summation circuitry, wherein the comparison-and-selection process reduces the position summation values generated by the summation circuitry to a largest position summation value. This thus enables the largest position summation value to be identified amongst the position summation values generated by the summation circuitry in an efficient manner.

On the basis of the identified largest position summation value (i.e. the highest histogram count) the output to be generated by the output circuitry, i.e. the statistical mode in the form of at least one data value from amongst the values provided by the at least one data element in the input data set, may be performed in a variety of ways, but in some embodiments the output circuitry comprises a comparator array to generate a mode position map dependent on comparisons between the largest position summation value and the position summation value for each position in the bit-map, wherein the output circuitry is arranged to generate the indication of the at least one data element in dependence on the mode position map. This thus supports an efficient identification of the position of the largest position summation value in the set of position summation values and on this basis the output circuitry can thus identify the at least one data element for output.

The maximum identification circuitry may also be provided in other ways and in particular in some embodiments may be based on more shift circuitry. For example, in some embodiments the maximum identification circuitry comprises further shift circuitry to generate, for each position summation value, a further bit-map giving a one-hot encoding representation of the position summation value, wherein a position of a set bit in the further bit-map is dependent on the position summation value, and the output circuitry is arranged to generate the indication of the at least one data element in dependence on all further bit-maps generated by the further shift circuitry. Accordingly, therefore further use is made of a set of one-hot encoding representations, where in this instance the representation corresponds to the respective position summation value. This enables use to be made of the respective positions of the single set bit ("one-hot") in the further bit-maps generated in order to determine the final data value or data values which should be provided at the output of the circuitry.

In some embodiments the maximum identification circuitry further comprises furthest set bit identification circuitry to identify amongst all further bit-maps generated by the further shift circuitry a highest set bit position. This highest set bit position thus indicates the position summation value with the highest value.

This highest set bit position can then be translated into an identification of that highest summation value in various ways. For example, in some embodiments the furthest set bit identification circuitry comprises logical disjunction circuitry for each further bit-map bit position, wherein the logical disjunction circuitry is arranged to generate a mode position map to indicating where the further bit-maps generated by the maximum identification circuitry have a set bit at the further bit-map bit position. The logical disjunction circuitry may for example be embodied as a set of OR gates.

In some embodiments the shift circuitry is provided by barrel shifter circuitry. In some embodiments the shift circuitry comprises one-hot decoding circuitry.

Amongst the data elements received in the input data the values represented may be such that more than one data element corresponds to the statistical mode. In other words, the frequency with which more than one data value occurs in the set of data elements may be equal and exceed the frequency of other data values. In such a situation the apparatus, and in particular the output circuitry thereof, may respond in a variety of different ways. For example, in some embodiments the output circuitry is responsive to a determination of more than one largest position summation value by the maximum identification circuitry to generate indications of more than one data element corresponding to the more than one largest position summation value. Thus, when this situation occurs the output circuitry may explicitly generate indications of those multiple data elements which are each equivalent statistical mode representations of the values represented in the input data.

However, in other example embodiments the output circuitry may select between such equivalent data elements. This selection may be based on a predetermined order of the data elements of the input data. For example, in some embodiments data elements of the input data have a predetermined order and wherein the output circuitry is responsive to a determination of more than one largest position summation value by the maximum identification circuitry to select the indication of the at least one data element corresponding to a highest ordinal data element in the predetermined order. In some embodiments the output circuitry is responsive to a determination of more than one largest position summation value by the maximum identification circuitry to select the indication of the at least one data element corresponding to a lowest ordinal data element in the predetermined order. Hence, when the input data are, say, provided by an input register, that input register may be read from left-to-right or from right-to-left to find the data element to be chosen for output.

In yet further example embodiments a random or pseudo-random selection between equivalent candidates may be made and thus in such embodiments the output circuitry is responsive to a determination of more than one largest position summation value by the maximum identification circuitry to generate an indication of a randomly selected data element amongst the more than one data element corresponding to the more than one largest position summation value.

The data elements in the input data received by the apparatus may in principle represent an unlimited variety of data types, but the inventors of the present techniques have found that useful employment of the techniques developed may be made in the context of class determination, where the input data represent indications of classes and a statistical mode determination among those indications is to be found, such that the output of the output circuitry is an indication of at least one selected class. Accordingly, in some embodiments the at least one data element in the input data received by the input circuitry is a class indication and the indication of at least one data element corresponding to the at least one largest position summation value generated by the output circuitry is an indication of at least one class. This may for example be the case in the context of a machine learning classification model for predicting a class, where the calculations of the model generate a number of candidate classes, from which one it to be selected and this selection may be performed by a statistical mode selection, i.e. the class most frequently indicated in a given input data set.

One context in which the disclosed techniques may find applicability is within the context of a data processing system which is arranged to be responsive to data processing instructions to perform data processing operations. Amongst the instructions defined for such a data processing system the present techniques propose that at least one statistical mode instruction is defined to allow the programmer to invoke operation of the above described apparatuses of the present techniques in any of the forms described. Accordingly, in some embodiments there is provided a data processing system comprising: data processing circuitry to perform data processing operations, the data processing circuitry comprising the above-described apparatus; instruction decoder circuitry to decode instructions and to generate control signals in dependence on the instructions to control the data processing circuitry to perform the data processing operations, wherein the instruction decoder circuitry is responsive to a statistical mode instruction specifying a vector input register to generate control signals to control the input circuitry to receive the input data from the vector input register.

The statistical mode instruction or statistical mode instructions to which the instruction decoder circuitry is configured to be responsive may be variously defined such that the statistical mode is determined on the basis of a variety of different possible inputs, and further that a variety of different representations of output are generated. Generally, however the statistical mode instruction specifies a vector input register, wherein the content of this vector input register provides the input data, i.e. the set of data elements from the content of which the statistical mode is to be determined.

In some embodiments the instruction decoder circuitry is responsive to the statistical mode instruction specifying a scalar output register to generate control signals to control the output circuitry to cause the indication of the at least one data element corresponding to the at least one largest position summation value to be stored as a scalar value in the scalar output register. The scalar output register thus stores the result of executing the statistical mode instruction, i.e. the mode of the data elements provided in the vector input register. It may be configured such that if there are multiple statistical mode values found it provides the first mode that is found (e.g. when considering the content of the vector input register in a given order), or may select among them by any of the other approaches as described herein.

In some embodiments the instruction decoder circuitry is responsive to the statistical mode instruction specifying a predicate map value to generate control signals to control the input circuitry to receive the input data dependent on the predicate map value from the vector input register. Accordingly, the predicate map value allows a selection to be made amongst the potential data elements for consideration in the vector input register to give those that are to be considered to find the statistical mode.

In some embodiments the instruction decoder circuitry is responsive to the statistical mode instruction specifying a mode map scalar output register to generate control signals to control the output circuitry to cause the indication of the at least one data element corresponding to the at least one largest position summation value to be stored as at least one set bit in a mode map value in the mode map scalar output register. Accordingly, the mode map scalar output register stores a bit-map, wherein the set bits of the bit-map point to all statistical modes found in the data elements in the vector input register.

In some embodiments the instruction decoder circuitry is responsive to the statistical mode instruction specifying a count scalar output register to generate control signals to control the output circuitry to cause the largest position summation value determined by the maximum identification circuitry to be stored in the count scalar output register. Accordingly, the count scalar output register stores the histogram count of the mode, i.e. the largest position summation value which caused this statistical mode to be selected for the output.

In some embodiments the instruction decoder circuitry is responsive to the statistical mode instruction specifying a count vector output register to generate control signals to control the output circuitry to cause all position summation values generated by the summation circuitry to be stored in the count vector output register. Accordingly, the count vector output register is used to store all position summation values (i.e. all histogram counts) generated as part of the statistical mode determination.

In some embodiments, the instruction decoder circuitry is responsive to the statistical mode instruction specifying a tiebreaker value to generate control signals, when more than one largest position summation value is determined by the maximum identification circuitry, to control the output circuitry to generate an indication of a selected data element corresponding to the more than one largest position summation value, wherein the selected data element is selected in dependence on the tiebreaker value. Accordingly, the tiebreaker value can be set to define how to break a tie between more than one candidate mode. This tiebreaker value may for example be a 2-bit value, where if this value is 00, the tie is broken randomly; if it is 01, the tie is broken by picking the first mode according to a predefined ordering of the data elements; and if it is 10 the tie is broken by picking the first mode according to an inversion of that predefined ordering of the data elements. This is clearly only one particular example and many variations for possible.

In some embodiments the instruction decoder circuitry is responsive to the statistical mode instruction specifying a weighting vector register to generate control signals to control the summation circuitry to generate the position summation value for each position in the bit-map weighted by respective weighting values in the weighting vector register. Accordingly, the weighting vector register is a vector register that stores the weights for the data elements and thus instead of having a equal vote for each data element these are each weighted. These weights may also be used to perform weighted voting to be used in the case of the requirement to break a tie.

In accordance with one example configuration there is provided a method of operating an apparatus comprising: receiving input data comprising at least one data element; generating, for each data element of the input data, a bit-map giving a one-hot encoding representation of the data element, wherein a position of a set bit in the bit-map is dependent on the data element; generating a position summation value for each position in the bit-map, wherein each position summation value is a sum across all bit-maps generated from the input data; determining at least one largest position summation value generated; and generating an indication of at least one data element corresponding to the at least one largest position summation value.

In accordance with one example configuration there is provided a computer program for controlling a host data processing apparatus to provide an instruction execution environment comprising: data processing logic to perform data processing operations, the data processing logic comprising: input logic to receive input data comprising at least one data element; shift logic to generate, for each data element of the input data, a bit-map giving a one-hot encoding representation of the data element, wherein a position of a set bit in the bit-map is dependent on the data element; summation logic to generate a position summation value for each position in the bit-map, wherein each position summation value is a sum across all bit-maps generated by the shift logic from the input data; maximum identification logic to determine at least one largest position summation value generated by the summation logic; and output logic to generate an indication of at least one data element corresponding to the at least one largest position summation value, instruction decoder logic to decode instructions and to generate control signals in dependence on the instructions to control the data processing logic to perform the data processing operations, wherein the instruction decoder logic is responsive to a statistical mode instruction specifying a vector input register to generate control signals to control the input logic to receive the input data from the vector input register.

Particular embodiments will now be described with reference to the figures.

Figure 3:
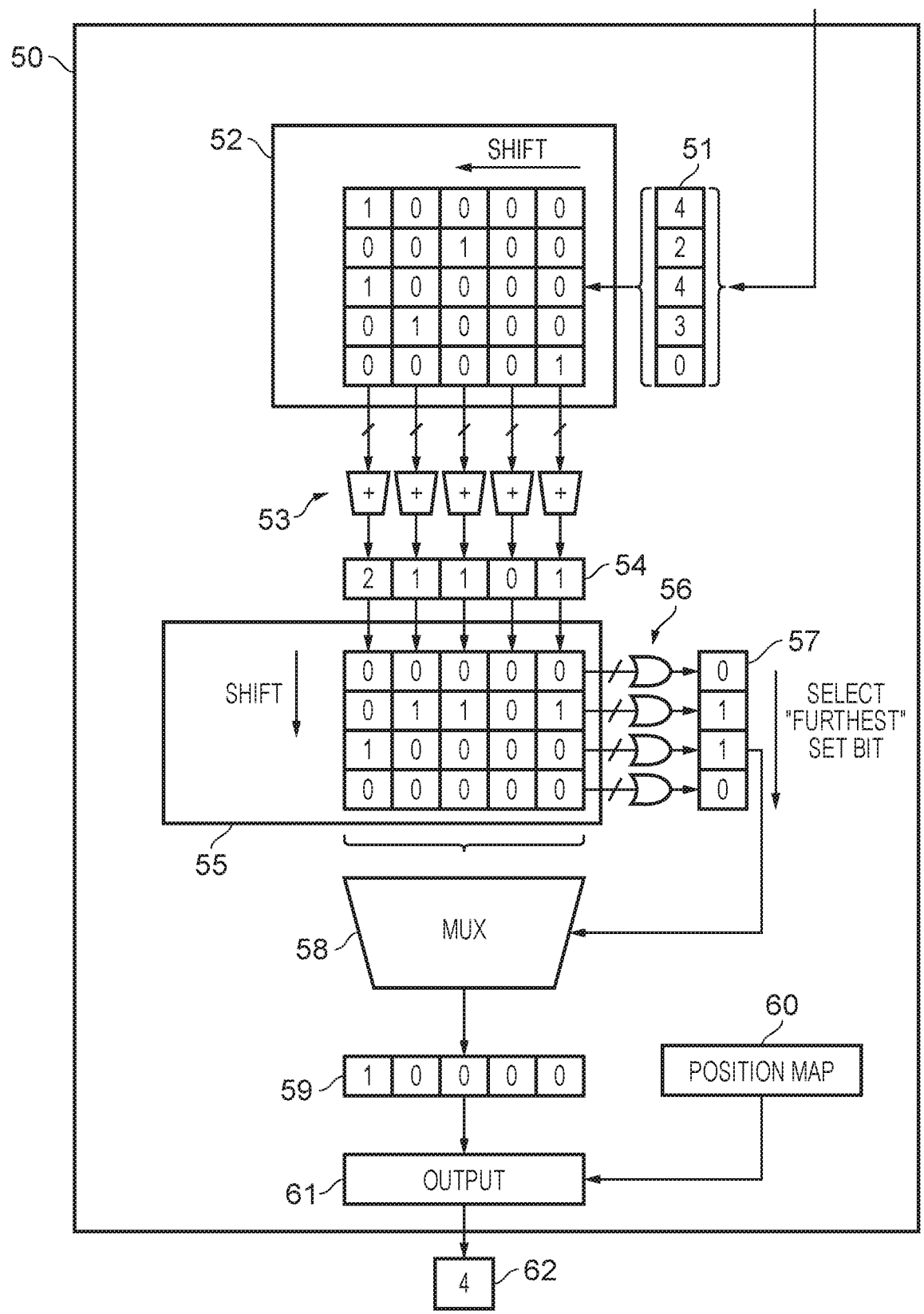
FIG. 3 schematically illustrates an apparatus in some example embodiments employing shifter circuitry to determine a maximum amongst multiple summation values.

FIG. 1 schematically illustrates an apparatus 10 in some example embodiments. Generally, the apparatus 10 is arranged to receive input data comprising at least one data element and on the basis of this input data to determine a statistical mode of the data values represented by the at least one data element. This statistical mode value forms the output of the apparatus. Input circuitry 11 of the apparatus receives the input data and passes the set of data elements to shift circuitry 12. The shift circuitry 12 operates on each data element independently to generate a "one-hot" encoding representation of that data element. The particular configuration of the shift circuitry in order to generate this representation can take a variety of forms, but may for example be provided by barrel shifters. It may also be provided by regular one-hot decoders, with which one of ordinary skill in the art is familiar and therefore this variant is not explicitly illustrated merely in the interests of brevity. Considered as a group the one-hot encoding representations of all data elements in the input data may be viewed as a bit-map 13, of which an example for ease of understanding is represented in FIG. 1. Thus, the first row of the bit-map 13 corresponds to the left-most data element of the input data (0), the second row of the bit-map 13 corresponds to the second data element of the input data (3), the third row of the bit-map corresponds to the third data element of the input data (2), and the last row of the bit-map 13 corresponds to the right-most data element of the input data (3). The bit-map 13 is then received by summation circuitry 14 which generates a summation value for each position in the bit-map, i.e. in the representation shown in FIG. 1 on a per-column basis. Example position summation values 15 are shown as an example for ease of understanding on the basis of the example values in the bit-map 13. Maximum identification circuitry 16 then determines the largest value or values amongst the summation values generated by the summation circuitry 14. Thus, the position (i.e. column) in the bit-map 13 with the greatest number of entries is identified, corresponding to a given data value amongst the data elements of the input data. In the example shown in FIG. 1 this identified maximum 17 is 2 on the basis of the input data shown. Examples where more than one equal maximum is identified by the maximum identification circuitry 16 are discussed below with reference to the figures which follow. The identified maximum is provided to the output circuitry 18 which then uses this value in order to identify the corresponding data value, which in the example shown in FIG. 3 is the value 3. Accordingly, this provides the output value 19 from the apparatus 10.

Figure 2:
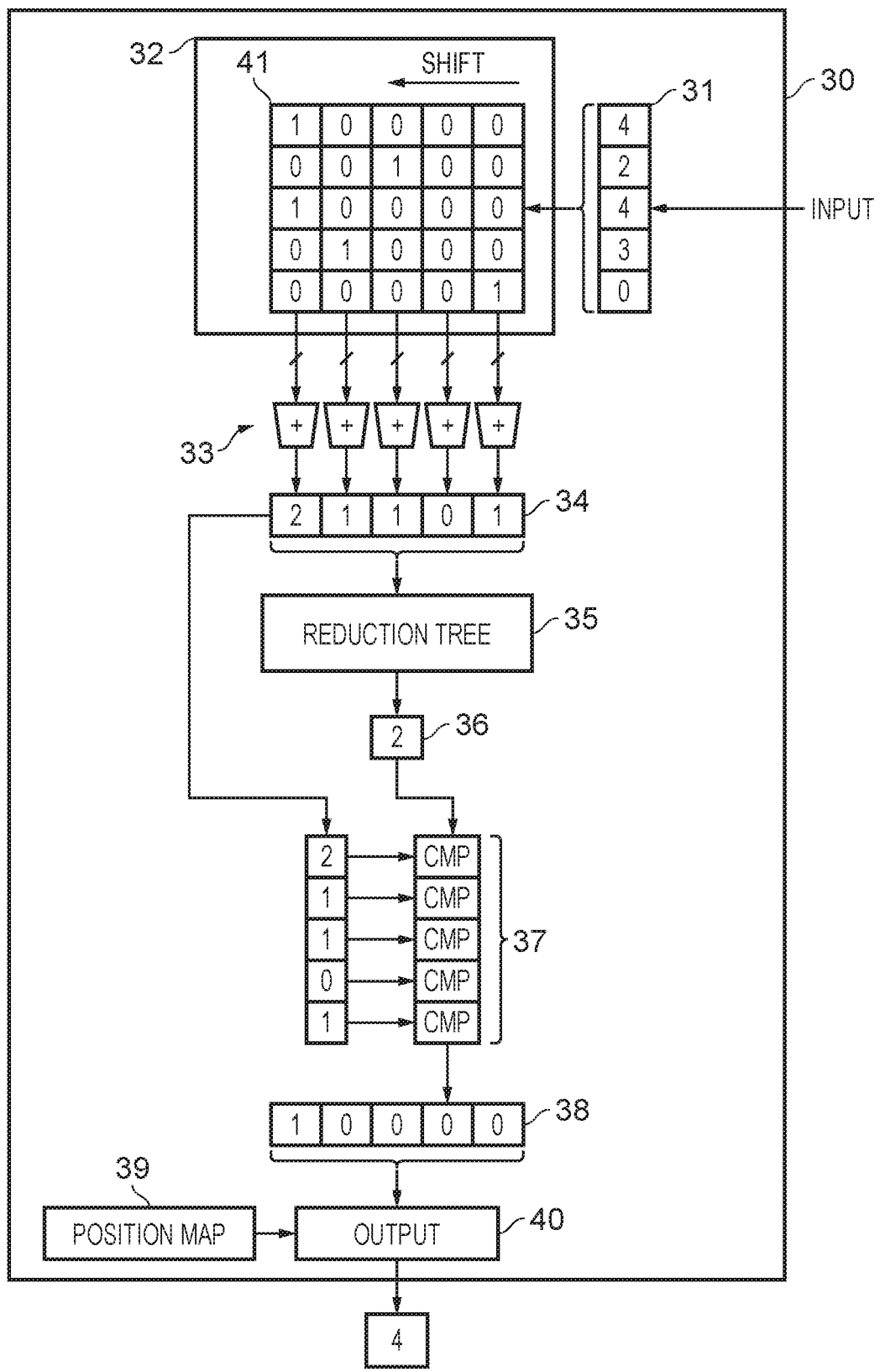
FIG. 2 schematically illustrates an apparatus in some example embodiments employing a reduction tree to select between multiple summation values.

FIG. 2 schematically illustrates an apparatus 30 in some example embodiments. Input data 31 forming a set of data elements are received as an input by the apparatus and these are passed to shift circuitry 32, which in this embodiment is provided as a set of barrel shifters. The barrel shifters of the shift circuitry 32 operate independently on each data element of the input data, shifting a set bit to a position which corresponds to the value of the respective data element. Accordingly, a bit-map 33 is generated formed of the set of one-hot encoding representations of the input data elements. A set of summation circuitry 41 is provided connected to the output of the shift circuitry, such that for each position in the bit-map (i.e. column in the representation shown in FIG. 2) a summation is performed. This may for example be embodied as a "popcount" operation. The position summation values 34 thus generated are shown in FIG. 2 for the example values being processed. The position summation values provide the input to a reduction tree 35 which performs comparisons between the values in order to determine the maximum amongst the position summation values, which in the example shown in FIG. 2 is the value 2. This maximum value identified 36 is then provided as one input to a set of comparators 37. The set of position summation values 34 provides respective inputs to each of the comparators, such that the position at which the maximum value 36 was generated can be found. The output of the comparators 37 thus provides an indication of the data value for which the maximum is found. This indication, in the form of a binary mode position map 38, is used in order to generate the final output value. In the illustrated embodiment the binary mode position map 38 is combined with a position map for the data values 39 via output circuitry 40 to do this, but it should be noted that use of the position map 39 is not always necessary. For example, the bit index of the set bit in register 38 will automatically give the statistical mode value. In the example shown, the bit index of the set bit is 4, which is the statistical mode. In other words the statistical mode can be derived directly in the output circuitry 40.

FIG. 3 schematically illustrates an apparatus 50 in some example embodiments. Similar to the example shown in FIG. 2 the input circuitry of the apparatus 50 receives input data providing a set of data elements 51. Shift circuitry 52 (in the same manner as described above for shift circuitry 32 of the apparatus 30) generates a one-hot encoding representation of each of the input data elements which together form a bit-map. Summation circuitry 53 (which as in the example of FIG. 2 and the summation circuitry 41 may be provided as a popcount array operation) generates a summation value corresponding to each position in the one-hot encoding representation, i.e. corresponding to the columns in FIG. 3. A set of position summation values 54 is thus generated. This set of values then provides the input to shift circuitry 55, which in a similar manner to the shift circuitry 52, translates the individual values into a one-hot encoding representation of each. Viewed together the one-hot encoding representations thus provide a further bit-map, and the rows of this bit-map (in the representation of FIG. 3), i.e. corresponding to each potential position for a set bit in each one-hot encoding representation, then provide the input to a set of gates 56. Generally, this set of gates 56 provides a logical disjunction function to determine if any of the bits in a given row (i.e. bit position) are set. In the example embodiment of FIG. 3 this is a set of OR gates. Thus, a bit-map representation 57 of the positions is generated. The bit corresponding to the "furthest" position in which a bit was set in the one-hot encoding representations of the position summation values is then selected, identifying the maximum summation value generated. This controls the multiplexer 58 for which the bit-map representation generated by the shift circuitry 55 provides another input and thus the row correspondingly selected is provided as the output 59. This output thus indicates the position of the statistical mode data value and in combination with the position map 60 the output circuitry can thus generate the statistical mode data value for output 62, which in the example of FIG. 3 is the value 4. As in the case of FIG. 2, although in the illustrated embodiment of FIG. 3 the binary mode position map 59 is combined with a position map 60 for the data values via the output circuitry 61, it should be noted that use of the position map 60 is not always necessary. For example, the bit index of the set bit in register 59 will automatically give the statistical mode value. In the example shown, the bit index of the set bit is 4, which is the statistical mode.

Figure 4A:
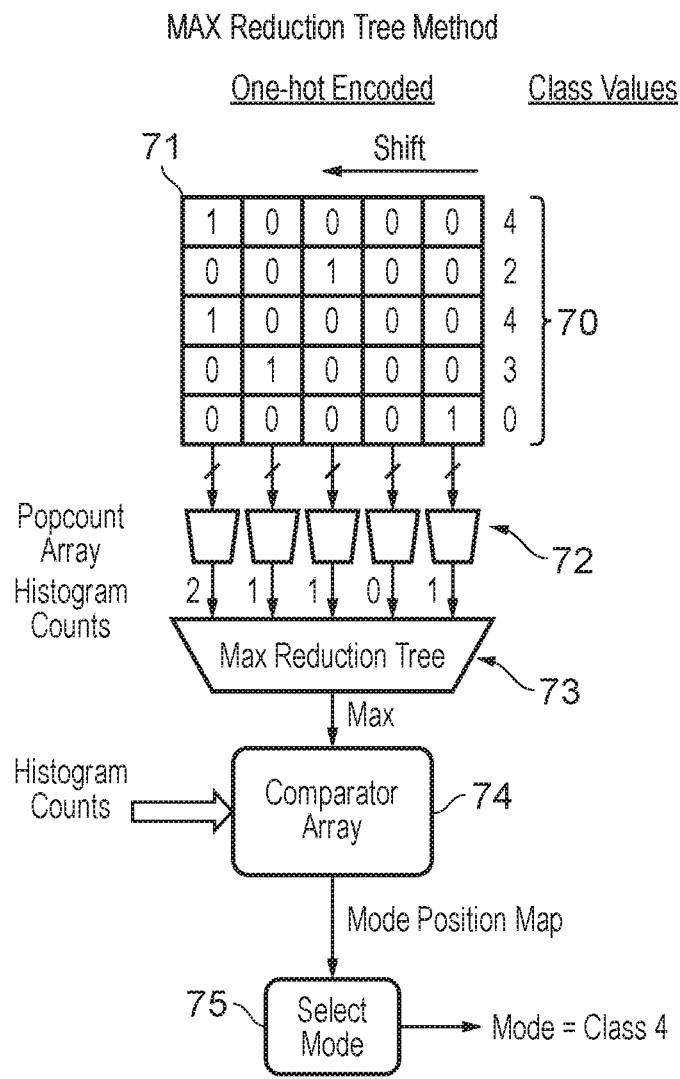
FIGS. 4A and 4B schematically illustrate further example embodiments generally corresponding to FIGS. 2 and 3 respectively.
Figure 4B:
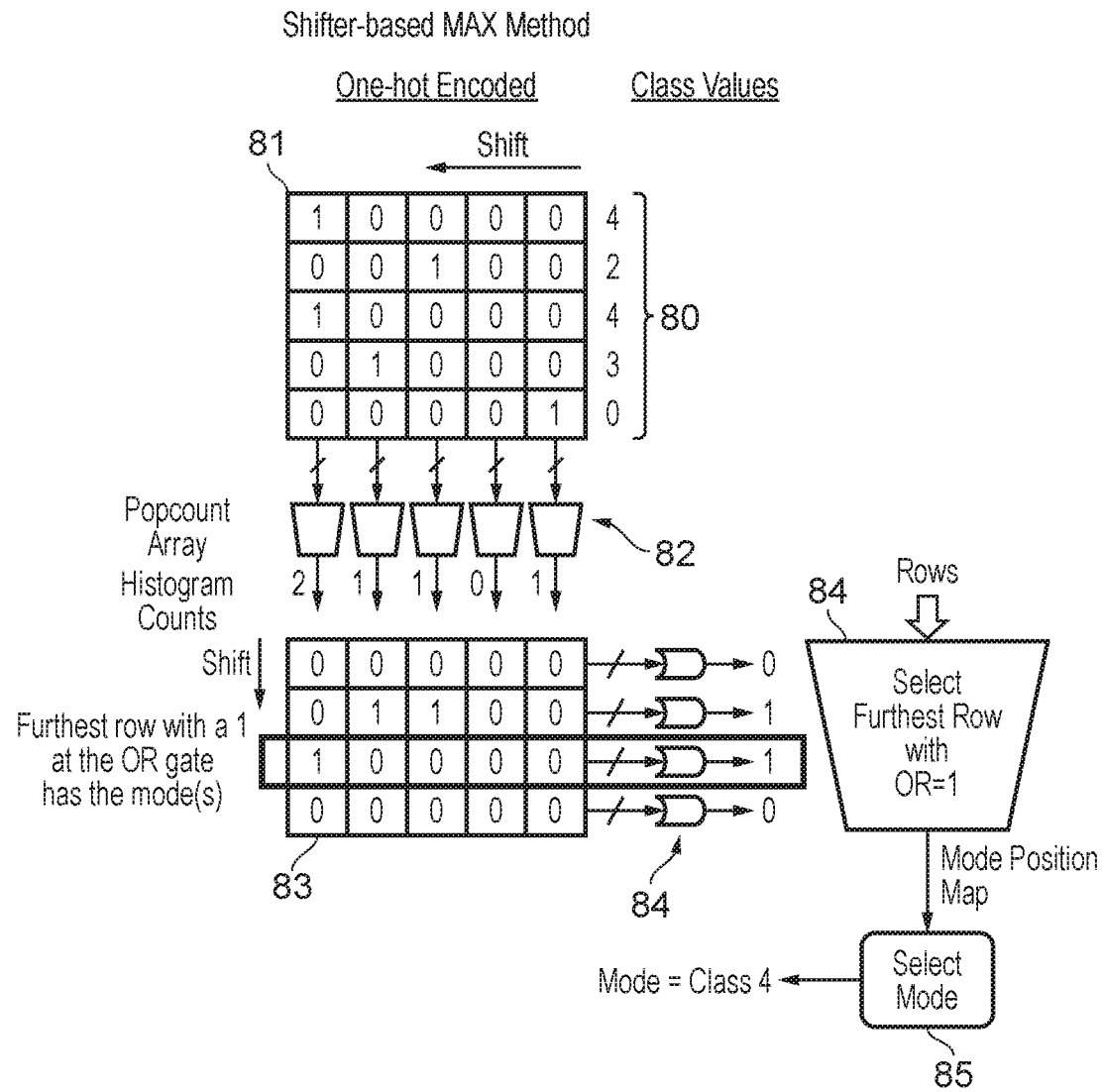

The present techniques may find applicability in a wide variety of contexts and accordingly the data values in the data elements which form the input data to the apparatus are not limited in what they may represent. However, one particular context in which the determination of a statistical mode amongst data values of a set of data elements may be used is that of a classification model used by an apparatus in order to provide a class prediction for a data set which is represented by a particular set of data values. For example, in a number of machine learning (ML) techniques a statistical mode operation may be employed in a final stage to select between candidate classifications could provide the final class prediction generated by the trained model. FIGS. 4A and 4B schematically illustrate the operation of two example apparatuses which are arranged to receive a set of data values and on the basis of those data values to generate an output which is a class prediction according to a classification model. In FIG. 4A the set of data values 70 provides the input data which shift circuitry receives. The shift circuitry performs individual shift operations on each data value into a one-hot encoding representation, such that a bit-map 71 is generated corresponding to the input data. This bit-map representation 71 feeds into the popcount array operations 72 which sum the respective one-hot encoding positions (i.e. columns in the representations of FIG. 4A) to generate histogram counts corresponding to each of the class values which were represented in the input data. The histogram counts are received by the maximum reduction tree circuitry 73 such that the histogram counts are reduced to a single value corresponding to the highest histogram count generated. This maximum value and the histogram counts are compared by comparator array 74 to generate a mode position map, indicating the position of the maximum within the histogram counts, i.e. also corresponding to the positions for the respective possible classifications. Finally, selection circuitry 75 selects the corresponding mode on the basis of the mode position map and indicates this as the output class prediction, which in the example of the values given (purely for illustrative purposes in FIG. 4A) is class 4.

An alternative approach to determining the statistical mode amongst input class values is shown for the example of FIG. 4B where the set of class values 80 forms the input set of data elements providing the input data to the apparatus. As in the case of FIG. 4A shift circuitry 81 operates on these data values transforming each into a one-hot encoding representation such that together a bit-map 81 is generated in which a position of a set bit in the bit-map represents the corresponding value of the input class value. The bit-map 81 provides the input to the popcount array 82 which sums each possible position in the one-hot encoding representation of each data element (i.e. columns in the representation of FIG. 4B) to generate a set of histogram counts corresponding to each possible class. This set of histogram counts provides the input to further shift circuitry which operates on each individual histogram count to generate a one-hot encoding representation of that count such that overall a bit-map 83 is generated. A set of OR gates 84 have their inputs provided by respective rows of this bit-map such that the output of the OR gates indicates whether there is at least one bit set in a given row. On this basis the furthest row with an OR=1 output is selected by circuitry 84 and the indication of this row is passed to selection circuitry 85 which can thus identify the selected class to output as the mode. In the example of FIG. 4B this is class 4.

Figure 5A:
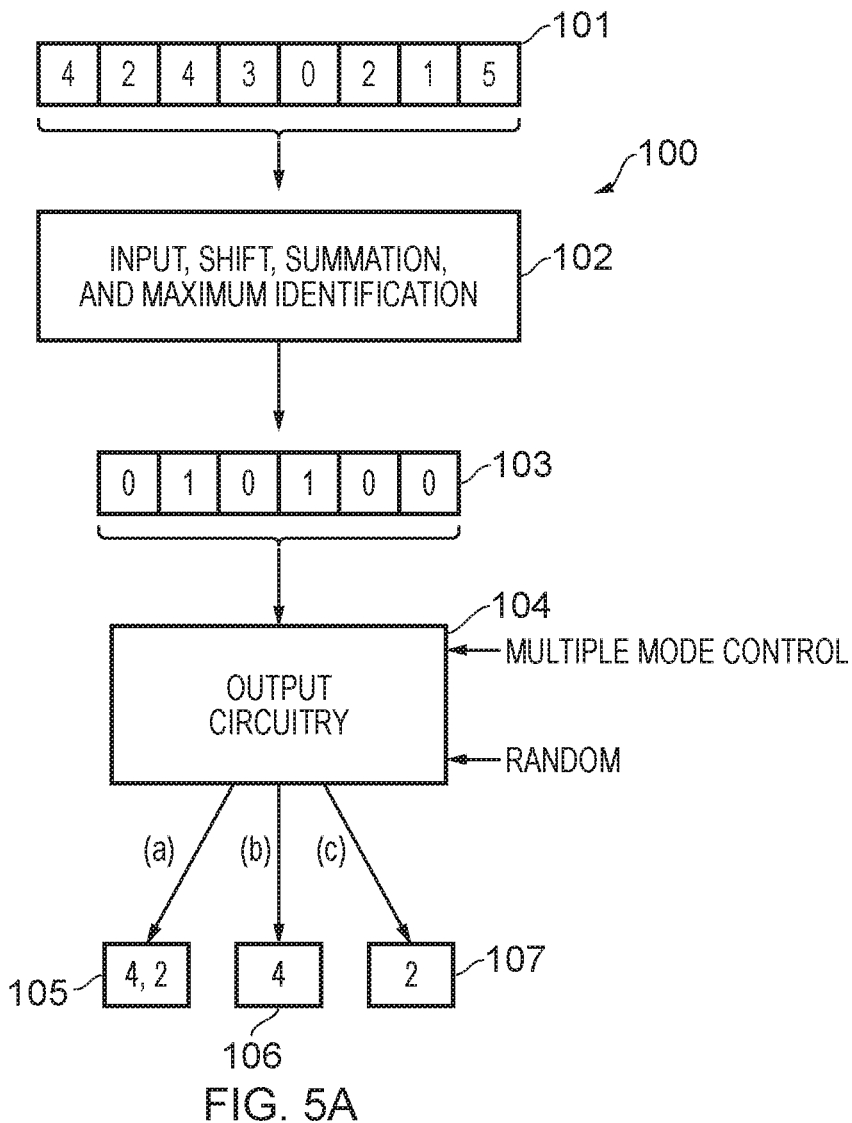
FIGS. 5A and 5B schematically illustrate apparatuses in some example embodiments in which output circuitry may be selectively configured in a number of different ways to select an output data element when more than one maximum count of equal value is determined.

As mentioned above for a given set of input data it is recognised that situations may arise in which more than one statistical mode of the data values can be identified. FIG. 5A schematically illustrates an apparatus 100 which is arranged with this in mind. As can be seen the input data 101 comprises a set of data elements, the values of which are such that two statistical mode values, namely 4 and 2 can be identified. The input data 101 are processed by the circuitry 102, which represents the input, shift, summation, and maximum identification circuitry discussed herein in any of the variants thereof. Accordingly, the maximum identification circuitry generates a mode position map 103 in which two positions are indicated by set bits. This mode position map 103 is then received by the output circuitry 104. The output circuitry 104 can be variously configured to affect the manner in which it responds to the situation in which more than one mode value is identified. This control is exerted by the "multiple mode control" signal and/or the "random" control inputs to the output control circuitry 104. On the basis of the control signals the output circuitry 104 can generate one of three different types of output labelled (a)-(c) in FIG. 5A. Situation (a) corresponds to a configuration according to which the output circuitry 104 is configured to output both mode values as its output 105. Alternatively, the output circuitry 104 can be configured so that it selects between multiple modes in order to only output one statistical mode value. Situation (b) corresponds to one possible output 106, whilst situation (c) corresponds to an alternative output 107. One manner according to which the output circuitry 104 may select is randomly (or pseudo-randomly) and either output 106 or 107 may result accordingly. Alternatively, the output circuitry 104 can be configured to treat the multiple modes according to a predefined ordering of the modes and to select between them on the basis of that ordering. For example, treating the data values as a decreasing sequence of values and selecting the first mode value according to that decreasing sequence encountered, the output circuitry 104 will select statistical mode=4 in the case of the example values shown in FIG. 5A. Conversely inverting the ordering the selection order will cause the output circuitry 104 to select statistical mode=2 as the output. As a further alternative the output circuitry 104 may revert to a consideration of the input data 101 in the format originally provided (e.g. with reference to a vector register storing these values) and select the output mode on the basis of the statistical mode value first seen when reading from the left (i.e. mode=4) or by picking the first mode value seen when reading from the right (i.e. mode=2).

Figure 5B:
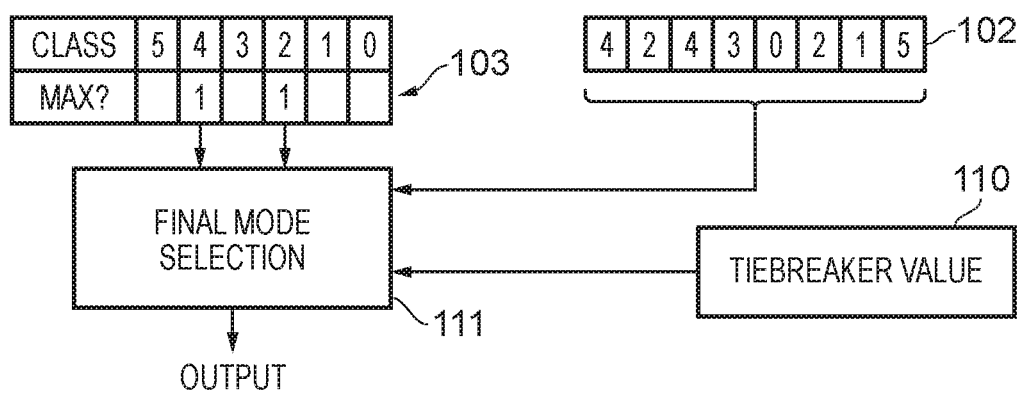

FIG. 5B schematically illustrates circuitry forming part of an apparatus in one example embodiment according to which control over selection between multiple statistical modes is provided by a tiebreaker value 110. This tiebreaker value 110 provides one input to final mode selection circuitry 111. The input data 102 forms another input to the final mode selection circuitry 111, as does a mode position map 103. On this basis, where the mode position map indicates two concurrent maximum values (corresponding to classes 4 and 2) the final mode selection circuitry 111 is controlled by the tiebreaker value 110 in order to determine a single class to indicate as the statistical mode. In this example the tiebreaker value is two-bit value, wherein when it has the value 00 the tie is broken randomly. When it has the value 01, the tie is broken by picking the first mode seen from the left in the input data value 102. When the tie breaker value is 10 the tie is broken by picking the first mode seen from the right.

Figure 6:
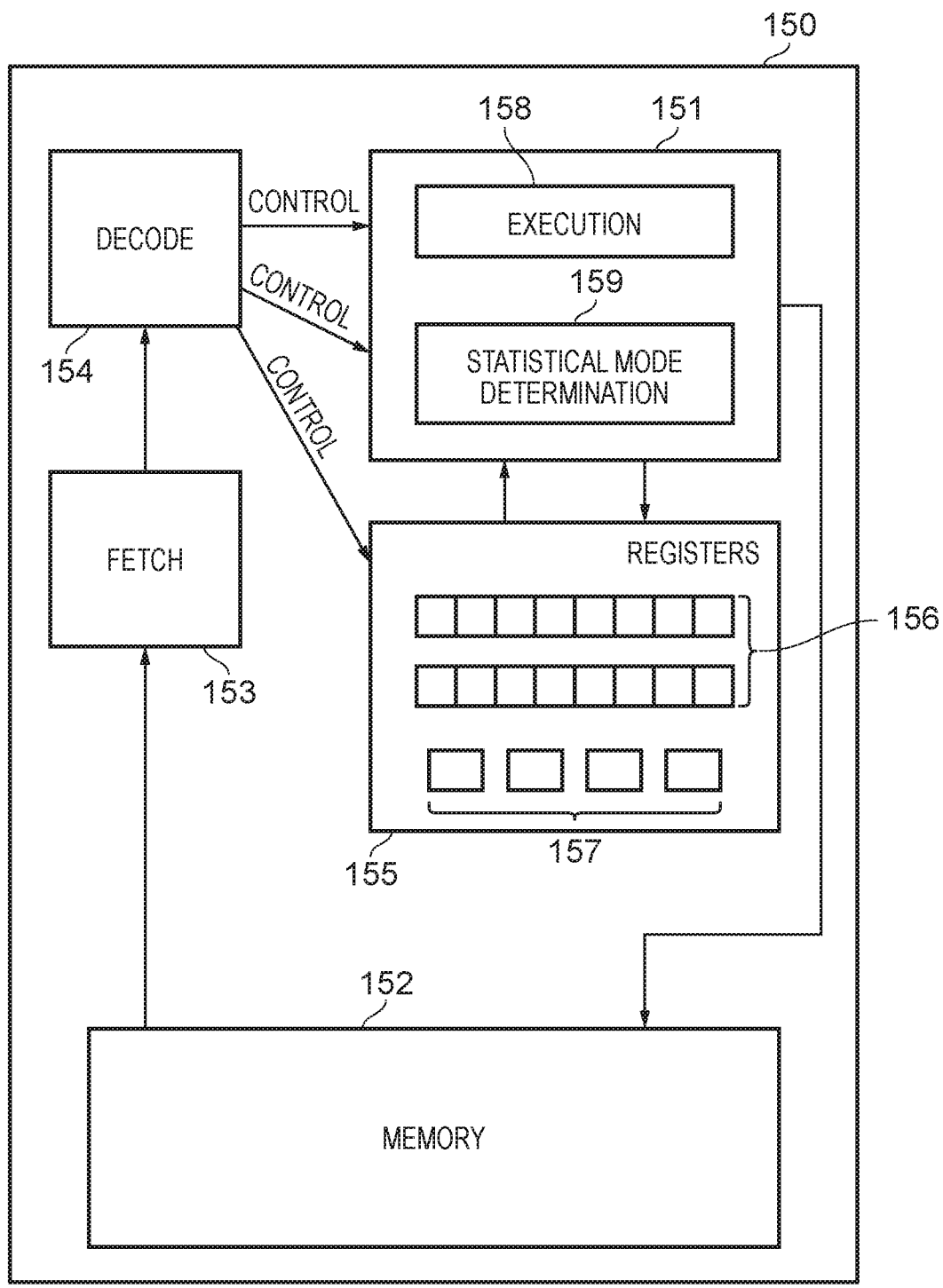
FIG. 6 schematically illustrates a data processing apparatus in some example embodiments arranged to perform data processing operations in response to a sequence of instructions, where at least one of those instructions is a statistical mode determination instruction.

FIG. 6 schematically illustrates a data processing apparatus 150 which may embody various examples of the present techniques. The apparatus comprises data processing circuitry 151 which performs data processing operations on data items in response to a sequence of instructions which it executes. These instructions are retrieved from the memory 152 to which the data processing apparatus has access and, in a manner in which one of ordinary skill in the art will be familiar, fetch circuitry 153 is provided for this purpose. Furthermore, instructions retrieved by the fetch circuitry 153 are passed to the instruction decoder circuitry 154, which generates control signals which are arranged to control various aspects of the configuration and operation of the processing circuitry 151, as well as a set of registers 155. Generally, the data processing circuitry 151 may be arranged in a pipeline fashion, but the specific details thereof not relevant to the present techniques. One of ordinary skill in the art will be familiar with the general configuration which FIG. 6 represents and further detailed illustration and description thereof is dispensed herewith merely for the purposes of brevity. The registers 155 comprise both vector registers 156 and scalar registers 157, such that the data processing circuitry 151 can perform both vector and scalar data processing operations. The data processing circuitry 151 comprises execution circuitry 158, which as mentioned above may be arranged in a pipelined fashion. A specific portion of the data processing circuitry 151 shown in FIG. 6 is the statistical mode determination circuitry 159, which may be arranged in accordance with any of the example embodiments or variants thereof described herein. Generally, therefore data values are retrieved from the memory 152 to be temporarily held in the registers 155, where they may be the subject of data processing operations, possibly modified, and if appropriate written back to the memory 152. The present techniques provide that the data processing apparatus 150 is responsive to at least one statistical mode operation which when decoded by the decode circuitry 154 causes the statistical mode determination circuitry 159 in the data processing circuitry 151 to be used in order to determine a statistical mode amongst data values represented by the content of one or more specified registers 155. Note also that generally the memory 152 in FIG. 6 can be seen as an example of a computer-readable storage medium in which the instructions of the present technique can be stored, typically as part of a predefined sequence of instructions (a "programs") which the processing circuitry then executes. The processing circuitry may however access such a program from a variety of different sources such as stored in RAM, in ROM, via a network interface, and so on.

Figure 7A:
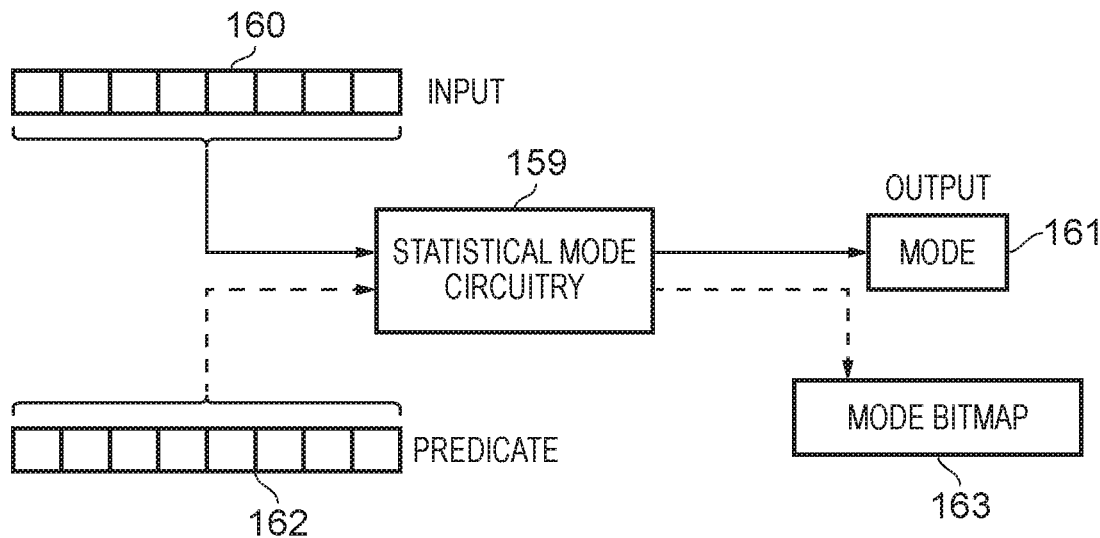
FIGS. 7A, 7B, and 7C schematically illustrates in more detail the statistical mode circuitry of the apparatus of FIG. 6 in some example embodiments.
Figure 7B:
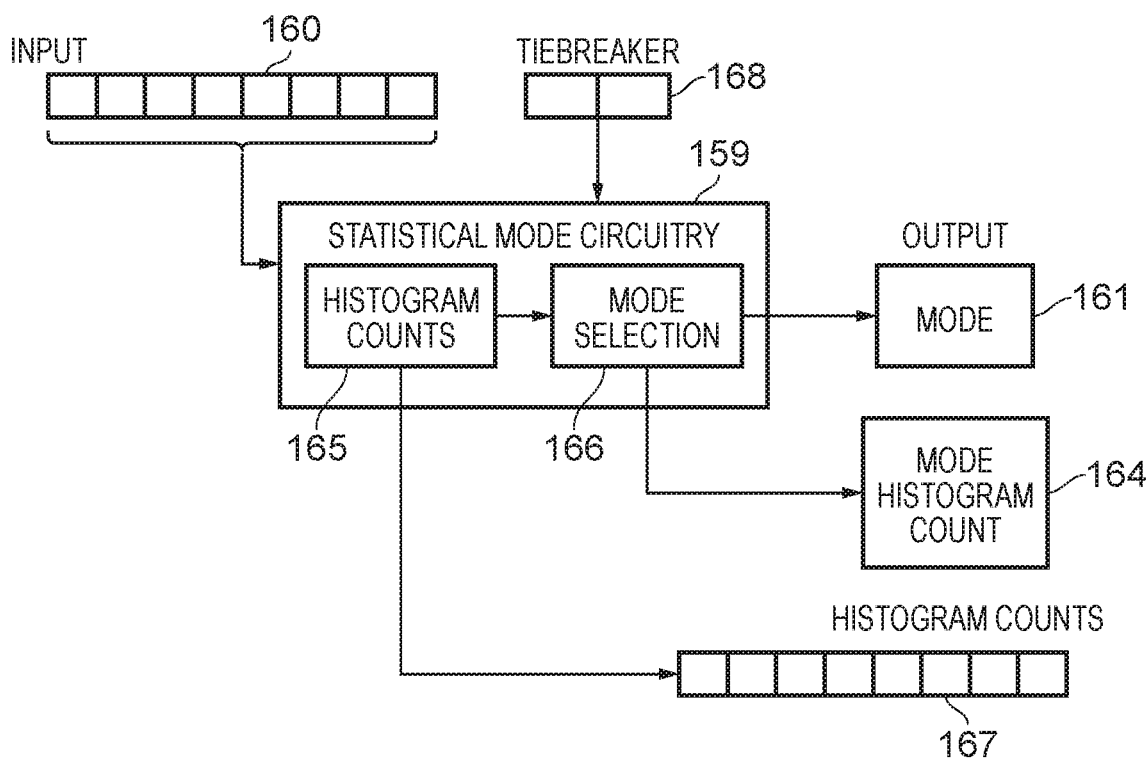
Figure 7C:
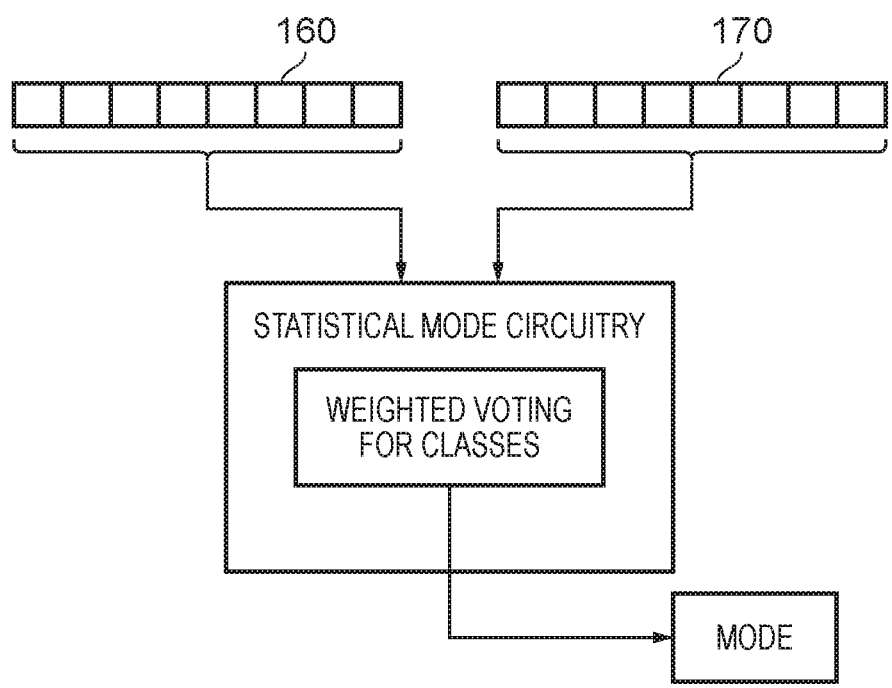

FIGS. 7A, 7B, and 7C schematically illustrates embodiments of the statistical mode circuitry 159, which are provided when the data processing apparatus 150 is responsive to various forms of statistical mode ("SMODE") instruction. One such instruction has the form:

SMODE Single_Mode_Reg, SIMD_Input_Reg where SIMD_Input_Reg is a vector input register (such as input register 160) and Single_Mode_Reg is a scalar output register (such as output register 161) for the result, i.e. the mode of the data elements. The statistical mode circuitry 159 may be arranged so that when multiple modes are found, the first mode that is found is given.

Another SMODE instruction to which the statistical mode circuitry 159 is responsive has the form:

SMODE Single_Mode_Reg, Predicate_Map, SIMD_Input_Reg where SIMD_Input_Reg and Single_Mode_Reg are as described above, and Predicate_Map is a map 162 that selects the input values in the SIMD register that are to be considered to find the statistical mode.

Another SMODE instruction to which the statistical mode circuitry 159 is responsive has the form:

SMODE ModeMap_Reg, SIMD_Input_Reg where SIMD_Input_Reg is as described above, and ModeMap_Reg is a scalar output register (such as output register 163) and stores a bitmap pointing at all the modes in the data elements rather than finding a single mode.

The above described variants of SMODE instructions may be combined in a further SMODE to which the statistical mode circuitry 159 is responsive having the form:

SMODE ModeMap_Reg, Predicate_Map, SIMD_Input_Reg where SIMD_Input_Reg, Predicate_Map, and ModeMap_Reg are as described above.

Now refer to FIG. 7B, although noting that the same statistical mode circuitry 159 is shown, indicating that one embodiment of the statistical mode circuitry may be responsive to all the SMODE instructions described herein. The examples of FIGS. 7A, 7B, and 7C are only separated for clarity of illustration and discussion.

Another SMODE instruction to which the statistical mode circuitry 159 is responsive has the form:

SMODE Single_Mode_Reg, Count_Reg, SIMD_Input_Reg where SIMD_Input_Reg and Single_Mode_Reg are as described above, and Count_Reg is a scalar output register (such as 164 in FIG. 7B) which stores the histogram count of the statistical mode. The histogram counting circuitry 165 and mode selection circuitry 166 of the statistical mode circuitry 159 provides this value.

Another SMODE instruction to which the statistical mode circuitry 159 is responsive has the form:

SMODE ModeMap_Reg, Count_Reg, SIMD_Input_Reg where SIMD_Input_Reg and ModeMap_Reg are as described above and Count_Reg is a scalar output register (such as 164 in FIG. 7B) and stores the histogram count of the mode(s) in the data elements.

Another SMODE instruction to which the statistical mode circuitry 159 is responsive has the form:

SMODE ModeMap_Reg, All_Count_Reg, SIMD_Input_Reg where SIMD_Input_Reg and ModeMap_Reg are as described above and All_Count_Reg is a vector output register (such as 167 in FIG. 7B) and stores the histogram counts of all data elements.

Another SMODE instruction to which the statistical mode circuitry 159 is responsive has the form:

SMODE Single_Mode_Reg, (Predicate_Map), SIMD_Input_Reg, Tie_Breaker_BitMap where Single_Mode_Reg, Predicate_Map and SIMD_Input_Reg are as described above and Tie_Breaker_BitMap is a bitmap value (for example a 2-bit value), which may be explicitly given in the instruction, or may be taken from a storage location 168 as shown in FIG. 7B. The value of Tie_Breaker_BitMap determines how the statistical mode circuitry 159 breaks a tie if there are more than one statistical mode. When the value is 00, the tie is broken randomly. When it is 01, the tie is broken by picking the first statistical mode seen from the left from SIMD_Input_Reg. When it is 10, the tie is broken by picking the first statistical mode seen from the right in SIMD_Input_Reg.

Finally referring to FIG. 7C (and again recalling that the examples of FIGS. 7A, 7B, and 7C are only separated for clarity of illustration and discussion), another SMODE instruction to which the statistical mode circuitry 159 is responsive has the form:

SMODE Single_Mode_Reg, (Predicate_Map), SIMD_Input_Reg, Weight_Input_Reg where Single_Mode_Reg, Predicate_Map and SIMD_Input_Reg are as described above and Weight_Input_Reg is a vector register (such as 170) that stores weights for the data values. Here, instead of having an equal vote for each data value, this instruction assigns a weight to each data value. For example, in the histogram counts for each data value generated, the calculated histogram counts may be scaled by a weight provided by Weight_Input_Reg for each data value. This approach can also be used to break ties.

Figure 8:
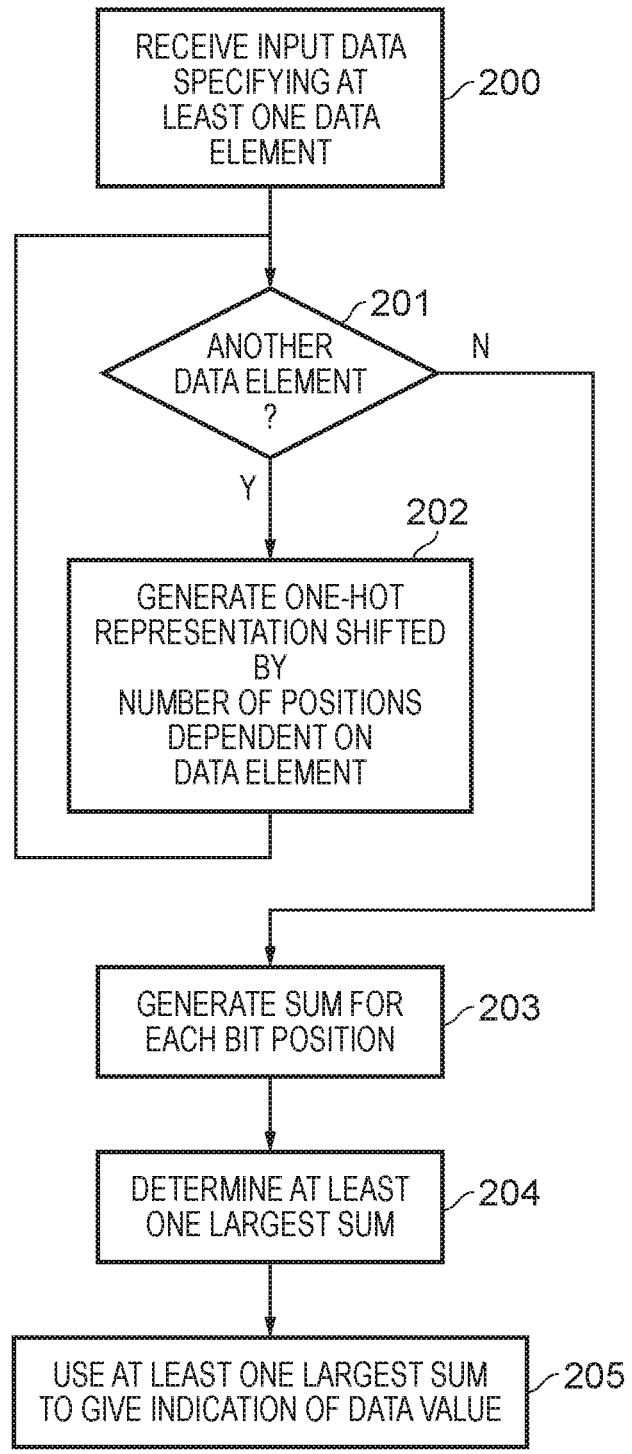
FIG. 8 is flow diagram showing a sequence of steps which are taken according to the method of some example embodiments.

FIG. 8 is a flow diagram showing a sequence of steps which are taken according to the method of some example embodiments. At step 200 input data is received specifying at least one data element. An iterative process with respect to the data elements in the input data is then represented in FIG. 8 comprising steps 201 and 202, which generate a one-hot representation of the data value represented by each data element. Thus, according to the flow of FIG. 8 at step 201 it is determined if there is another data element to process into this format and whilst there is the flow proceeds via step 202 where a one-hot representation is generated for that data element, where the single set bit is shifted by a number of positions which depend on the value represented by the data element. It should be appreciated that this sequential processing of the data elements of the input data is represented in FIG. 8 only for clarity of discussion and the present techniques are not limited to implementations in which such serial generation of the one-hot representations is carried out. Indeed in many implementations shift circuitry can be provided for each data element of the input data so that these one-hot representations are generated in parallel with one another. However produced, once this stage is finished the flow proceeds to step 203 where a sum is generated for each bit position in the one-hot representation. At step 204 it is then determined which sum is largest (or if there are multiple equivalent largest sums) and finally at step 205 the at least one largest sum is used to determine at least one data value represented in the input data for the output.

Figure 9:
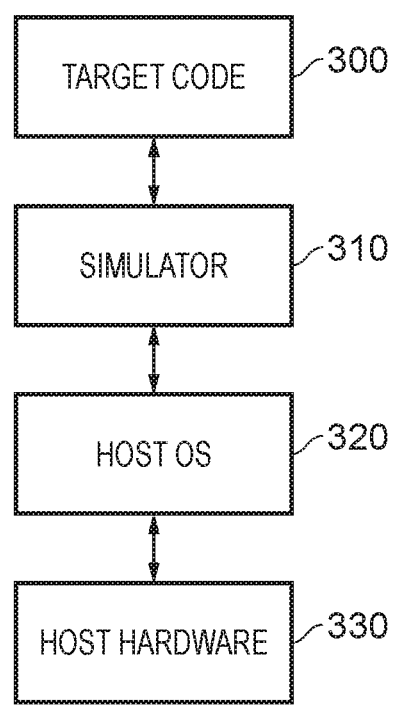
FIG. 9 schematically illustrates a simulator implementation in some example embodiments.

FIG. 9 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software-based implementation of a hardware architecture. Varieties of simulator computer programs include emulators, virtual machines, models, and binary translators, including dynamic binary translators. Typically, a simulator implementation may run on a host processor 330, optionally running a host operating system 320, supporting the simulator program 310. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 330), some simulated embodiments may make use of the host hardware, where suitable.

The simulator program 310 may be stored on a computer-readable storage medium (which may be a non-transitory medium), and provides a program interface (instruction execution environment) to the target code 300 which is the same as the application program interface of the hardware architecture being modelled by the simulator program 310. Thus, the program instructions of the target code 300, including the statistical mode instructions described herein, may be executed from within the instruction execution environment using the simulator program 310, so that a host computer 330 which does not actually have the hardware features of the apparatus 10 discussed above can emulate these features.

In brief overall summary apparatuses, methods of operating apparatuses, and corresponding computer programs are disclosed. In the apparatuses input circuitry receives input data comprising at least one data element and shift circuitry generates, for each data element of the input data, a bit-map giving a one-hot encoding representation of the data element, wherein a position of a set bit in the bit-map is dependent on the data element. Summation circuitry generates a position summation value for each position in the bit-map, wherein each position summation value is a sum across all bit-maps generated by the shift circuitry from the input data. Maximum identification circuitry determines at least one largest position summation value generated by the summation circuitry and output circuitry to generate an indication of at least one data element corresponding to the at least one largest position summation value. The statistical mode of the data elements in the input data is thereby efficiently determined.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

We claim:

1. Apparatus comprising:
    input circuitry to receive input data comprising at least one data element;
    shift circuitry to generate, for each data element of the input data, a bit-map giving a one-hot encoding representation of the data element, wherein a position of a set bit in the bit-map is dependent on the data element;
    summation circuitry to generate a position summation value for each position in the bit-map, wherein each position summation value is a sum across all bit-maps generated by the shift circuitry from the input data;
    maximum identification circuitry to determine at least one largest position summation value generated by the summation circuitry; and
    output circuitry to generate an indication of at least one data element corresponding to the at least one largest position summation value.

2. The apparatus as claimed in claim 1, wherein the maximum identification circuitry comprises reduction tree circuitry to perform a comparison-and-selection process on the position summation values generated by the summation circuitry, wherein the comparison-and-selection process reduces the position summation values generated by the summation circuitry to a largest position summation value.

3. The apparatus as claimed in claim 2, wherein the output circuitry comprises a comparator array to generate a mode position map dependent on comparisons between the largest position summation value and the position summation value for each position in the bit-map, wherein the output circuitry is arranged to generate the indication of the at least one data element in dependence on the mode position map.

4. The apparatus as claimed in claim 1, wherein the maximum identification circuitry comprises further shift circuitry to generate, for each position summation value, a further bit-map giving a one-hot encoding representation of the position summation value, wherein a position of a set bit in the further bit-map is dependent on the position summation value,
    and the output circuitry is arranged to generate the indication of the at least one data element in dependence on all further bit-maps generated by the further shift circuitry.

5. The apparatus as claimed in claim 4, wherein the maximum identification circuitry further comprises furthest set bit identification circuitry to identify amongst all further bit-maps generated by the further shift circuitry a highest set bit position.

6. The apparatus as claimed in claim 5, wherein the furthest set bit identification circuitry comprises logical disjunction circuitry for each further bit-map bit position, wherein the logical disjunction circuitry is arranged to generate a mode position map to indicating where the further bit-maps generated by the maximum identification circuitry have a set bit at the further bit-map bit position.

7. The apparatus as claimed in claim 1, wherein the shift circuitry comprises barrel shifter circuitry.

8. The apparatus as claimed in claim 1, wherein the shift circuitry comprises one- hot decoding circuitry.

9. The apparatus as claimed in claim 1, wherein the output circuitry is responsive to a determination of more than one largest position summation value by the maximum identification circuitry to generate indications of more than one data element corresponding to the more than one largest position summation value.

10. The apparatus as claimed in claim 1, wherein data elements of the input data have a predetermined order and wherein the output circuitry is responsive to a determination of more than one largest position summation value by the maximum identification circuitry to select the indication of the at least one data element corresponding to a highest ordinal data element in the predetermined order.

11. The apparatus as claimed in claim 1, wherein data elements of the input data have a predetermined order and wherein the output circuitry is responsive to a determination of more than one largest position summation value by the maximum identification circuitry to select the indication of the at least one data element corresponding to a lowest ordinal data element in the predetermined order.

12. The apparatus as claimed in claim 1, wherein the output circuitry is responsive to a determination of more than one largest position summation value by the maximum identification circuitry to generate an indication of a randomly selected data element amongst the more than one data element corresponding to the more than one largest position summation value.

13. The apparatus as claimed in claim 1, wherein the at least one data element in the input data received by the input circuitry is a class or category indication and the indication of at least one data element corresponding to the at least one largest position summation value generated by the output circuitry is an indication of at least one class or category.

14. A data processing system comprising:
data processing circuitry to perform data processing operations, the data processing circuitry comprising the apparatus as claimed in claim 1;
instruction decoder circuitry to decode instructions and to generate control signals in dependence on the instructions to control the data processing circuitry to perform the data processing operations,
wherein the instruction decoder circuitry is responsive to a statistical mode instruction specifying a vector input register to generate control signals to control the input circuitry to receive the input data from the vector input register.

15. The data processing system as claimed in claim 14, wherein the instruction decoder circuitry is responsive to the statistical mode instruction specifying a scalar output register to generate control signals to control the output circuitry to cause the indication of the at least one data element corresponding to the at least one largest position summation value to be stored as a scalar value in the scalar output register.

16. The data processing system as claimed in claim 14, wherein the instruction decoder circuitry is responsive to the statistical mode instruction specifying a predicate map value to generate control signals to control the input circuitry to receive the input data dependent on the predicate map value from the vector input register.

17. The data processing system as claimed in claim 14, wherein the instruction decoder circuitry is responsive to the statistical mode instruction specifying a mode map scalar output register to generate control signals to control the output circuitry to cause the indication of the at least one data element corresponding to the at least one largest position summation value to be stored as at least one set bit in a mode map value in the mode map scalar output register.

18. The data processing system as claimed in claim 14, wherein the instruction decoder circuitry is responsive to the statistical mode instruction specifying a count scalar output register to generate control signals to control the output circuitry to cause the largest position summation value determined by the maximum identification circuitry to be stored in the count scalar output register.

19. The data processing system as claimed in claim 14, wherein the instruction decoder circuitry is responsive to the statistical mode instruction specifying a count vector output register to generate control signals to control the output circuitry to cause all position summation values generated by the summation circuitry to be stored in the count vector output register.

20. The data processing system as claimed in claim 14, wherein the instruction decoder circuitry is responsive to the statistical mode instruction specifying a tiebreaker value to generate control signals, when more than one largest position summation value is determined by the maximum identification circuitry, to control the output circuitry to generate an indication of a selected data element corresponding to the more than one largest position summation value, wherein the selected data element is selected in dependence on the tiebreaker value.

21. The data processing system as claimed in claim 14, wherein the instruction decoder circuitry is responsive to the statistical mode instruction specifying a weighting vector register to generate control signals to control the summation circuitry to generate the position summation value for each position in the bit-map weighted by respective weighting values in the weighting vector register.

22. A method of operating an apparatus comprising:
receiving, by input circuitry, input data comprising at least one data element;
generating, by shift circuitry, for each data element of the input data, a bit-map giving a one-hot encoding representation of the data element, wherein a position of a set bit in the bit-map is dependent on the data element;
generating, by summation circuitry, a position summation value for each position in the bit-map, wherein each position summation value is a sum across all bit-maps generated from the input data;
determining, by maximum identification circuitry, at least one largest position summation value generated; and
generating, by output circuitry, an indication of at least one data element corresponding to the at least one largest position summation value.

23. A non-transitory storage medium storing a computer program that when executed controls a host data processing apparatus to provide an instruction execution environment comprising:
data processing logic to perform data processing operations, the data processing logic comprising:
input logic to receive input data comprising at least one data element;
shift logic to generate, for each data element of the input data, a bit-map giving a one-hot encoding representation of the data element, wherein a position of a set bit in the bit-map is dependent on the data element;
summation logic to generate a position summation value for each position in the bit-map, wherein each position summation value is a sum across all bit-maps generated by the shift logic from the input data;
maximum identification logic to determine at least one largest position summation value generated by the summation logic; and
output logic to generate an indication of at least one data element corresponding to the at least one largest position summation value,
instruction decoder logic to decode instructions and to generate control signals in dependence on the instructions to control the data processing logic to perform the data processing operations,
wherein the instruction decoder logic is responsive to a statistical mode instruction specifying a vector input register to generate control signals to control the input logic to receive the input data from the vector input register.

* * * * *